United States Patent [19]
Maroschak

[11] 3,799,418
[45] Mar. 26, 1974

[54] APPARATUS AND METHOD FOR POSITIVELY FEEDING CORRUGATED PIPE

[75] Inventor: Ernest J. Maroschak, Roseboro, N.C.

[73] Assignee: Plastic Tubing, Inc., Roseboro, N.C.

[22] Filed: June 13, 1972

[21] Appl. No.: 262,193

[52] U.S. Cl............ 226/6, 226/76, 226/25, 226/44, 226/42
[51] Int. Cl............................. B65h 17/38
[58] Field of Search............ 226/42, 6, 52, 76, 111, 226/25, 44; 15/104.3 SN

[56] References Cited
UNITED STATES PATENTS
3,119,537  1/1964  Smits.................................. 226/111
2,960,851  11/1960  Ciaccio...................... 15/104.3 SN
3,625,099  12/1971  Mase et al. ........................... 226/76
3,620,115  11/1971  Zieg et al............................. 83/226

Primary Examiner—Allen N. Knowles
Attorney, Agent, or Firm—Parrott, Bell, Seltzer, Park & Gibson

[57] ABSTRACT

An apparatus and method for feeding a molded corrugated plastic pipe having annular corrugations of alternating ribs and valleys thereon, and wherein the pipe is positively fed or conveyed forwardly in engagement with a pair of rotating feed members. At least one of the feed members is driven under control of a pipe tension sensing means and has a plurality of peripheral teeth thereon which successively enter successive valleys in the pipe and push forwardly against respective ribs of the pipe.

13 Claims, 15 Drawing Figures

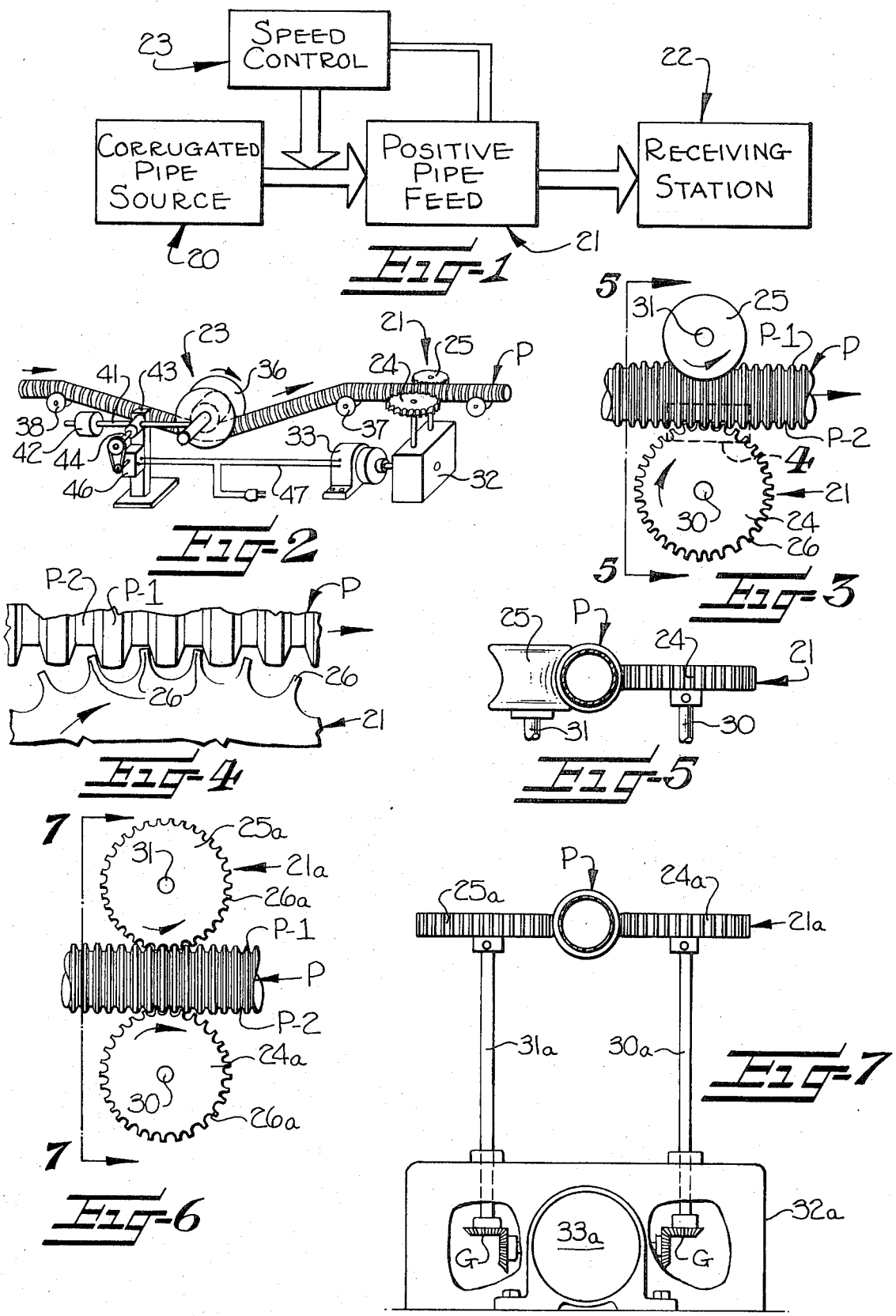

APPARATUS AND METHOD FOR POSITIVELY FEEDING CORRUGATED PIPE

This invention relates to an improved apparatus and method for positively feeding or conveying corrugated plastic pipe from one location to another, and it is an object of this invention to provide a method and apparatus for feeding a molded corrugated plastic pipe wherein the pipe is passed between and in engagement with a pair of rotating feed members, at least one of which is driven and has a plurality of teeth on the periphery thereof, and during which the plurality of teeth are sucessively moved into engagement with the corrugations of the pipe with successive teeth entering successive valleys of the corrugations and pushing forwardly against the respective ribs of the corrugated pipe. Thus, while the teeth of said one of the rotating feed members are pushing forwardly against the ribs of the corrugated pipe, the other of the rotating feed members is maintaining the pipe in meshing relation with the teeth of said one of the rotating feed members.

It is a more specific object of this invention to provide apparatus and method of the character described wherein variations in tension in the corrugated pipe being fed are sensed, and the rate of rotation of the feed members is varied in response to the sensing of variations in the tension in the corrugated pipe to thereby vary the rate or feed of the pipe.

Some of the objects of the invention having been stated, other objects will appear as the description proceeds when taken in connection with the accompanying drawings, in which:

FIG. 1 is a block diagram illustrating a positive pipe feed and a related feed control of the invention positioned between a corrugated pipe source and a receiving station;

FIG. 2 is a somewhat schematic perspective view of one embodiment of the positive pipe feed mechanism and the associated feed control mechanism;

FIG. 3 is an enlarged plan view of the positive pipe feed mechanism shown in FIG. 2;

FIG. 4 is an enlarged fragmentary plan view of the area 4 shown in dotted lines in FIG. 3 and particularly illustrating the teeth on the periphery on one of the rotating feed members in meshing relation with the ribs and valleys of an adjacent portion of the corrugated plastic pipe;

FIG. 5 is an enlarged fragmentary elevation of the first embodiment of the positive pipe feed mechanism taken substantially along line 5—5 in FIG. 3, and showing the corresponding corrugated plastic pipe in section;

FIG. 6 is a view similiar to FIG. 3 but showing a second embodiment of the positive pipe feed mechanism in which both of the pair of rotating feed members are provided with teeth on the periphery thereof which meshingly engage substantially diametrically opposed portions of the corrugated pipe being fed therebetween;

FIG. 7 is a somewhat schematic, fragmentary, elevation of the second embodiment of the positive pipe feed mechanism taken substantially along line 7—7 in FIG. 6;

Figure 8:
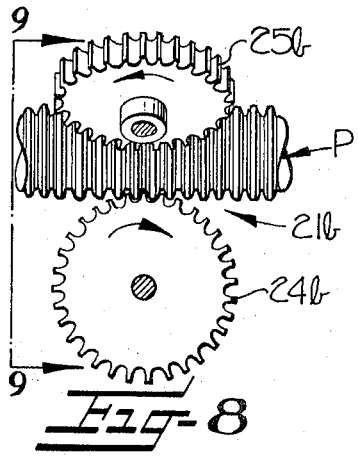
FIGS. 8 and 9 are views similar to the respective FIGS. 3 and 5 but showing a third embodiment of the positive pipe feed mechanism wherein the pipe is engaged and fed by three angularly spaced feed gears or peripherally toothed rotating feed members.

Referring more specifically to the drawings, the first embodiment of the invention is shown in FIGS. 1-5, and it will be observed, with particular reference to FIG. 1, that molded corrugated plastic pipe is withdrawn from and fed forwardly from a corrugated pipe source 20 by a positive pipe feed mechanism 21 which feeds the pipe to a receiving station. The pipe feed mechanism 21 is controlled by a speed control mechanism 23 which senses variations in the rate of feed or tension in the corrugated pipe for controlling the operation of the positive pipe feed mechanism 21. As shown, the speed control mechanism 23 acts upon the corrugated pipe at a point between the source 20 and the positive pipe feed mechanism 21. However, it is to be understood that the speed control mechanism 23 may act upon the corrugated pipe at a point between the positive pipe feed mechanism 21 and the receiving station 22, without departing from the invention.

The corrugated pipe source 20 may take various forms. For example, the corrugated pipe source 20 may take the form of a large bin in which a supply of the corrugated pipe is stored, or it may be in the form of a reel of the corrugated pipe. As best shown in FIGS. 3 and 4, the corrugated plastic pipe is generally designated at P and is provided with annular corrugations of alternating ribs P-1 and valleys P-2. The corrugated plastic pipe P may be of the type disclosed in my copending application Ser. No. 228,508, filed Feb. 23, 1972, and entitled CORRUGATED DRAINAGE PIPE, to which reference is made for a more detailed disclosure.

In the first embodiment of the invention, the positive pipe feed mechanism 21 takes the form of a pair of rotatable feed members 24, 25, the first feed member 24 being driven and having a plurality of teeth 26 spaced about the periphery thereof so that the first rotatable feed member 24 is essentially in the form of a spur gear. Conventionally, the valleys P-2 in the corrugated plastic pipe P are relatively narrow as compared to the width of the ribs P-1 and, accordingly, the radially projecting teeth 26 on the feed gear 24 are relatively narrow so that they may readily enter into the valleys P-2. On the other hand, the grooves defined between adjacent teeth 26 on the feed gear 24 are relatively wide and deep so as to readily accommodate the ribs P-1 of the corrugated plastic pipe P between the adjacent teeth 26 of the feed gear 24. It is apparent that the distance from the center of one tooth 26 to the center of the next adjacent tooth 26 on the feed gear 24 should be about the same as the distance between the centers of adjacent ribs P-1 or the distance between the centers of adjacent valleys P-2 of the corrugated plastic pipe P.

The second rotatable feed member 25 preferably is in the form of a disc or drum having a concave, relatively smooth, peripheral surface thereon whose concave curvature substantially corresponds to that of the outside surface of the corrugated plastic pipe P.

Either or both of the rotatable feed members 24, 25 may be driven and, if only one of the rotatable feed members 24, 25 is driven, it is preferred that the peripherally toothed rotatable feed member 24 is driven. In any event, as shown in FIGS. 2, 3 and 5, the rotatable feed members 24, 25 are fixedly mounted on the upper portions of respective substantially vertically disposed shafts 30, 31.

The lower portions of shafts 30, 31 (FIG. 2) are mounted in a suitable gear box 32 whose input is driven by an electric motor 33. The gear box 32 may contain gearing such as is associated with the second embodiment (see FIG. 7). Thus, it is seen that the rotatable feed members 24, 25 cooperate to positively feed the corrugated plastic pipe P forwardly or from left to right in FIGS. 1-4, as the feed gear 24 defines a plurality of forwardly moving teeth which successively enter successive valleys P-2 in the corrugated plastic pipe and push forwardly against the respective ribs P-1 of the corrugated plastic pipe, and wherein the second rotatable feed member 25 defines a rotatable guiding surface engageable with a portion of the corrugated pipe spaced angularly from or substantially diametrically opposite from that portion of the pipe P which is being engaged by the moving teeth 26 for restraining the corrugated pipe against laterial movement away from the forwardly moving teeth and thereby insuring that the teeth 26 are maintained in proper engagement with the ribs and valleys of the pipe P. The toothed surface 26 preferably is relatively thin as compared to the diameter of the pipe P, as shown, so the feed gear 24 is of relatively light weight even though its diameter is preferably at least about twice the diameter of pipe P. The pipe may be in the range of about 4 to 6 inches in diameter, for example.

In order to more accurately control the feeding of the pipe, especially if the pipe is subject to longitudinal stretching and contraction during the feeding thereof, the speed control mechanism 23 is shown in FIG. 2 in the form of a tension sensing means comprising a flanged roller or drum 36 which engages and rests against the upper surface of a looped portion of the corrugated plastic pipe P defined between a pair of supporting members 37, 38 positioned upstream of the positive pipe feed mechanism 21.

Drum 36 is rotatably mounted on one end of a lever 41 which may be provided with counterbalancing weight means 42 on the end thereof remote from drum 36. A medial portion of lever 41 is pivotally mounted on a standard 43 and has a pivot shaft 44 extending outwardly therefrom which pivots with lever 41 and thus transmits motion to a rheostat or potentiometer 46. Potentiometer 46 is electrically connected, as by means of conductors 47, to electric motor 33. Thus, whenever drum 36 moves downwardly in FIG. 2 as a result of the tension in the pipe P being reduced below a predetermined optimum, potentiometer 46 increases the speed of motor 33 to correspondingly increase the speed of the rotatable feed members 24, 25 of positive pipe feeding mechanism 21, thus increasing the forward speed of the corrugated plastic pipe P to compensate for the slackened condition thereof. Conversely, when drum 36 is moved upwardly above the desired optimum position by an increase in tension in the corrugated plastic pipe P between the supporting elements 37, 38, it is apparent that potentiometer 46 reduces the speed of electric motor 33 to, in turn, reduce the speed of the pair of rotatable feed members 24, 25. Thus, the forward speed of the corrugated plastic pipe P is compensatively reduced so that the positive pipe feeding mechanism 21 feeds and advances the corrugated plastic pipe P to the receiving station 22 at a substantially constant speed and under substantially constant tension.

The second embodiment of the positive pipe feeding mechanism shown in FIGS. 6 and 7 is similar to the first embodiment shown in FIGS. 1-5 and differs therefrom only in that both of the rotatable feed members for feeding the corrugated plastic pipe are in the form of feed gears. Accordingly, with the exception of pipe P, those elements shown in FIGS. 6 and 7 which correspond to similar elements shown in FIGS. 1-5 will bear the same reference characters with the small letter "a" added to avoid repetitive description. More specifically, the positive pipe feeding apparatus is broadly designated at 21a in the FIGS. 6 and 7, and both of the rotatable feed members 24a, 25a are in the form of spur gears having respective peripheral teeth 26a thereon which are spaced in the same manner as that described with respect to the teeth 26 of the first rotatable feed member 24 in the first embodiment of the invention. Thus, the teeth 26a of both rotatable feed members 24a, 25a of the second embodiment of the positive pipe feeding mechanism 21a are moved sucessively into engagement with the corrugations of the pipe P so that successive teeth 26a, in each instance, will enter successive valleys P-2 in the corresponding corrugated plastic pipe P.

As in the first embodiment of the invention, either or both of the rotatable feed members 24a, 25a may be driven. As shown in FIG. 7, and as is preferred, both of the pair of rotatable feed members 24a, 25a of positive pipe feeding mechanism 21a are driven by suitable gear means G within gear box 32a. Gear box 32a may be driven and controlled as described with respect to FIG. 2 and, accordingly, a further description of the second embodiment of the positive pipe feeding mechanism 21a is deemed unnecessary.

Figure 9:
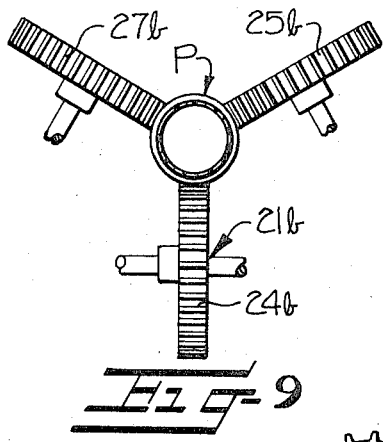

In the third embodiment of the invention shown in FIGS. 8 and 9, the positive pipe feed mechanism 21b comprises three peripherally toothed rotatable feed members or feed gears 24b, 25b, 27b shown engaging the corrugations of pipe P at angularly spaced points whose centers preferably are disposed about 120° apart from each other about the axis of the corrugated plastic pipe P. Each of the three feed gears 24b, 25b, 27b may be identical to the feed gear 24 of the first embodiment of the invention, and each of the feed gears 24b, 25b, 27b may be driven in substantially the same manner described with respect to the feed gear 24 of the first embodiment of the invention. Accordingly, a detailed description of the third embodiment of the positive pipe feeding mechanism 21b in FIGS. 8 and 9 is deemed unnecessary, suffice it to state that any one of the three feed gears 24b, 25b, 27b, or all of them, may be driven provided that they are rotated at the same peripheral speed and with their proximal portions meshingly engaging the corrugated plastic pipe P.

Figure 10:
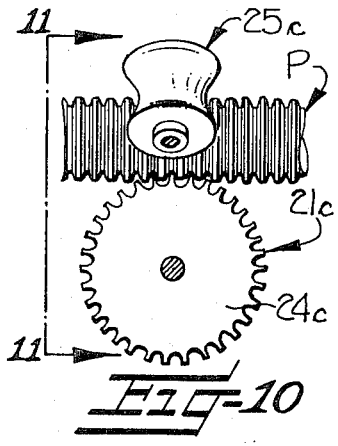
FIGS. 10 and 11 are fragmentary views similar to the respective FIGS. 8 and 9, but showing a fourth embodiment of the positive pipe feed mechanism wherein two smooth faced concave rollers engage angularly spaced portions of the corrugated plastic pipe for maintaining the same in engagement with the teeth of a driven feed gear or toothed rotating feed member.
Figure 11:
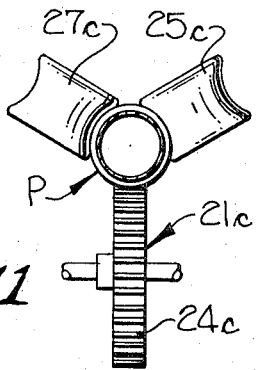

The fourth embodiment of the positive pipe feeding mechanism is broadly designated at 21c in FIGS. 10 and 11 and also comprises three rotatable feed members 24c, 25c, 27c whose relative positions may be identical to the relative positions of the rotatable feed members 24b, 25b, 27b of the third embodiment of the invention shown in FIGS. 8 and 9. In fact, the fourth embodiment of the positive pipe feeding mechanism 21c differs from the third embodiment 21b only in that the two rotatable feed members 25c, 27c are in the form of concave rollers having relatively smooth peripheral surfaces, such as the roller 25 of the first embodiment of the positive pipe feeding mechanism 21. In other respects, the fourth embodiment of the positive pipe feeding mechanism 21c may be identical to the third embodiment 21b, and, therefore, a further description of the fourth embodiment of the positive pipe feeding mechanism 21c is deemed unnecessary.

Figure 12:
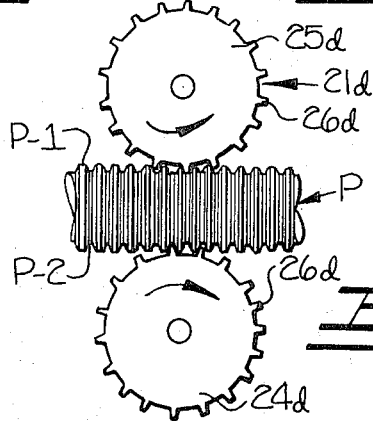
FIG. 12 is a fragmentary plan view similar to FIG. 6 showing a fifth embodiment of the positive pipe feed mechanism, wherein substantially diametrically opposed portions of the corrugated plastic pipe are engaged by toothed rotating feed members with the teeth of each respective feed member being engageable with alternately spaced ribs of the corrugated plastic pipe.

The fifth embodiment of the positive pipe feeding mechanism is broadly designated at 21d and is shown in FIG. 12. The positive pipe feeding mechanism 21d shown in FIG. 12 is substantially the same as that shown at 21a in FIGS. 6 and 7 and will bear the same reference characters, where applicable with the small letter "d" being substituted for the small letter "a" shown in FIGS. 6 and 7 in order to avoid repetitive description. The positive pipe feeding mechanism 21d is shown in FIG. 12 for the purpose of illustrating the fact that, where two or more rotatable feed members are employed, both of which are driven and which are provided with teeth on the periphery thereof, it is not necessary that each of the rotatable feed members be provided with a tooth thereon for engaging each successive rib P-1 of the corrugated plastic pipe P to be fed thereby.

Accordingly, for purposes of illustration, it will be observed in FIG. 12 that the two peripherally toothed driven rotatable feed members or feed gears 24d, 25d are each provided with a series of circularly spaced peripheral teeth 26d thereon, but the center to center distance between adjacent teeth 26d, in each instance, is equal to the center to center distance between alternate ribs P-1, or to the center to center distance between alternate valleys P-2, of the corrugated plastic pipe P being fed in FIG. 12. However, the teeth 26d of the first rotatable feed member or feed gear 24d are disposed in out-of-phase relation to the teeth 26d of the second rotatable feed member or feed gear 25d so as to insure that the tooth of one or the other of the two rotatable feed members 24d, 25d is always in meshing engagement with the corrugations of the pipe passing between and being fed forwardly by the rotatable feed members 24d, 25d, unless, of course, a portion or portions of the pipe P may not be provided with corrugations therein.

In this regard, for example, the corrugated plastic pipe P may be provided with spaced non-corrugated bell portions or coupler portions at spaced intervals therealong and it is contemplated that, upon such bell portions or coupler portions moving into registration with a pair of rotatable feed members, the rotatable feed members may move apart from each other sufficiently to permit the corresponding bell portion or coupler portion to pass between the rotatable feed members. In such an instance, the apparatus may be provided with longitudinally spaced sets of rotatable feed members such that, when the rotatable feed members of one pair are caused to move apart from each other to accommodate movement of a bell portion or coupler portion of the corrugated plastic pipe P therebetween, the rotatable feed members of another succeeding or preceding pair may be in engagement with and effect the forward feeding movement of the corrugated plastic pipe.

Figure 13:
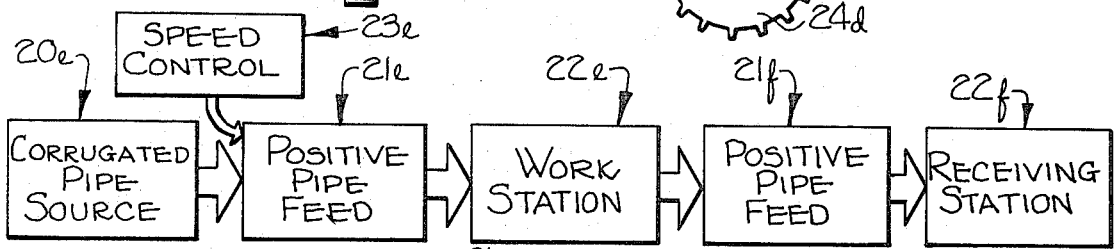
FIG. 13 is a block diagram similar to FIG. 1, but showing a sixth embodiment wherein two positive pipe feed mechanisms are employed upstream and downstream, respectively, of a work or processing station.
Figure 14:
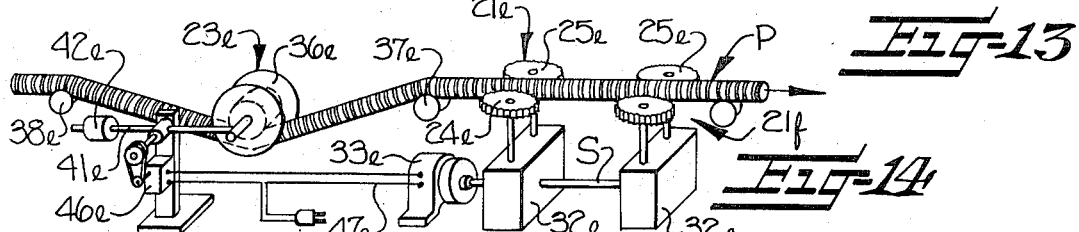
FIG. 14 is a schematic illustration of the two positive pipe feed mechanisms of FIG. 13 and the associated speed control mechanism.
Figure 15:
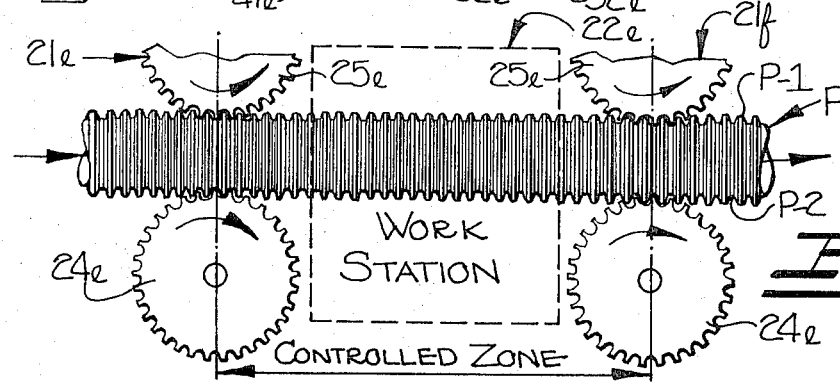
FIG. 15 is a schematic plan view of the positive pipe feed mechanisms and the work station of FIG. 13.

The sixth embodiment of the invention is shown in FIGS. 13, 14, and 15 and is quite similar to the first embodiment of the invention in FIGS. 1–5 with the important exception that two sets of rotatable feed members are provided in longitudinally spaced relationship to ensure an exact indexing relationship between the ribs or valleys of the corresponding corrugated plastic pipe P in its course past working instrumentalities, not shown, of a suitable work station disposed between the two sets of rotatable feed members. Accordingly, the embodiment of FIGS. 13, 14, and 15 also includes a corrugated pipe source 20e, a first positive pipe feed mechanism 21e, a work station or processing station 22e, a second positive pipe feeding mechanism 21f, and a receiving station 22f which are arranged in series in FIG. 13. The first and second positive pipe feeding mechanisms 21e, 21f are controlled by a common speed control mechanism generally designated at 23e in FIGS. 13 and 14.

The speed control mechanism 23e of FIGS. 13 and 14 may be identical to the speed control mechanism 23 of FIGS. 1 and 2 and, accordingly, those parts of the speed control mechanism 23e shown in FIG. 14 which are identical to or substantially the same as like parts shown in FIG. 2 will bear the same reference characters with the small letter "e" added, where applicable, to avoid repetitive description. Additionally, each of the two positive pipe feeding mechanisms 21e, 21f in the sixth embodiment of the invention may be identical to the positive pipe feeding mechanism 21 of the first embodiment of the invention, with the rotatable feed members thereof being arranged in the manner of any one of the pipe feeding mechanisms 21, 21a, 21b, 21c or 21d heretofore described. Accordingly, those parts associated with the two positive pipe feeding mechanisms 21e and 21f in FIGS. 14 and 15 which correspond with like parts shown in FIG. 2 also will bear the same reference characters, where applicable, with the small letter "e" added to avoid repetitive description. However, it is to be noted that both of the gear boxes 32e shown in FIG. 14 are interconnected by a drive shaft S and are driven by a common motor 33e instead of there being a separate motor provided for driving each of the gear boxes and each of the sets of rotatable feed members 24e, 25e.

From the foregoing description of FIG. 14, it is apparent that, as long as the peripheral speed of the two rotatable feed members 24e, 25e of the first positive pipe feeding mechanism 21e is the same as the peripheral speed of the two rotatable feed members 24e, 25e of the second positive pipe feeding mechanism 21f, there always will be a constant number of ribs P-1 in that length or portion of the corrugated plastic pipe P passing between the positive pipe feeding mechanisms 21e, 21f as long as the respective pairs of rotatable feed members 24e, 25e are meshingly engaging the corrugations of the corrugated plastic pipe P. It is apparent, that, upon any variations in tension in the corrugated plastic pipe P being detected by the sensing means 36e of the speed control mechanism 23e, the potentiometer 46e will change the speed of drive motor 33e to compensatively vary the rate of rotation of the rotatable feed members 24e, 25e associated with both of the positive pipe feeding mechanisms 21e, 21f. Thus, it can be seen that, in the event the work station 22e is to mark or form holes, for example, between certain adjacent ribs P-1 of the corrugated plastic pipe P in FIG. 15, the two sets of rotatable feed members 24e, 25e in FIG. 15 then will ensure that a predetermined relationship is maintained between the work station 22e and the moving ribs or valleys, as the case may be, of the pipe P being fed by the rotatable feed members of the first and second positive pipe feeding mechanisms 21e, 21f. In other words, on each cycle of the work station, a respective particular portion of the pipe P in FIG. 15 may be positioned in proper relationship to working instrumentalities of the work station.

It is thus seen that I have provided an improved apparatus and method for feeding a molded corrugated plastic pipe having annular corrugations of alternating ribs and valleys along its length and wherein the pipe is passed between and in engagement with a pair of rotating feed members, at least one of the feed members being driven under control of a pipe tension sensing means and having a plurality of teeth on the periphery thereof, and wherein the teeth of the driven rotating feed member successively move forwardly into engagement with the corrugations of the pipe with successive teeth entering the successive valleys of the pipe and pushing forwardly against the respective ribs of the corrugated pipe to insure that the pipe is positively fed forwardly at all times during which the corrugations of the pipe are being engaged by the rotating feed members.

In the drawings and specification there have been set forth preferred embodiments of the invention and, although specific terms are employed, they are used in a generic and descriptive sense only, and not for purposes of limitation.

That which is claimed is:

1. A method of feeding a molded corrugated plastic pipe from a source to a receiving station and wherein the pipe is provided with annular corrugations of alternating ribs and valleys along its length, said method comprising feeding the pipe by engaging the corrugations of the pipe between the source and the receiving station with a plurality of forwardly moving teeth with successive teeth entering successive valleys and pushing forwardly against the respective ribs of the corrugated pipe, sensing variations in tension in the corrugated pipe between the source and said feeding and in response thereto varying the rate of movement of the forwardly moving teeth to thereby vary the rate of feed of the pipe.

2. A method of feeding a molded corrugated plastic pipe having annular corrugations of alternating ribs and valleys along its length, said method comprising passing the pipe between and in engagement with a pair of rotating feed members at least one of which is driven and has a plurality of teeth on the periphery thereof, while successively moving the plurality of teeth forwardly into engagement with the corrugations of the pipe with successive teeth entering successive valleys and pushing forwardly against the respective ribs of the corrugated pipe to feed the pipe, sensing variations in tension in the corrugated pipe upstream of said feeding and in response thereto varying the rate of rotation of said rotating feed members to thereby vary the rate of feed of the pipe.

3. A method according to claim 2, wherein the other of the rotating feed members has a smooth peripheral surface and wherein the feeding of the pipe further comprises rotating said other rotating feed member by movement of the pipe thereagainst.

4. A method according to claim 2, wherein the other of the rotating feed members also has a plurality of teeth on the periphery thereof and wherein the feeding of the pipe further comprises successively moving the last-named plurality of teeth forwardly into engagement with the corrugations of the pipe with the successive teeth of the last-named plurality also entering successive valleys and pushing forwardly against the respective ribs of the corrugated pipe.

5. A method according to claim 2, which comprises simultaneously passing the pipe between the first-named pair of feed members and an additional rotating feed member engaging the pipe in angularly spaced relation from the first-named pair of rotating feed members.

6. A method of feeding a longitudinally compressible and extensible molded corrugated plastic pipe through a work station while maintaining a predetermined relationship between the corrugated pipe and the work station and wherein said pipe includes alternating ribs and valleys along its length, said method comprising passing the pipe in engagement with a first rotating tooth feed member at the entrance into the work station, while also passing the pipe in engagement with a second rotating toothed feed member at the exit from the work station, while successively moving the teeth of each feed member into engagement with the corrugations of the pipe with successive teeth of each feed member entering successive valleys of the corrugated pipe and pushing forwardly against the respective ribs of the pipe, while rotating the first and second rotary feed members at predetermined uniform speed, sensing variations in tension in the corrugated pipe upstream of and in its course to said first rotating toothed feed member, and varying the rate of rotation of the first and second feed members in response to the thus sensed variations in tension.

7. Apparatus for feeding a molded corrugated plastic pipe from a source to a receiving station and wherein the pipe is provided with annular corrugations of alternating ribs and valleys along its length, said apparatus being disposed between said source and said receiving station and comprising means defining a plurality of forwardly driven teeth for successively entering certain successive valleys in the corrugated pipe and pushing forwardly against the respective ribs of the pipe for advancing the pipe, means positioned upstream of said advancing means for sensing variations in tension in the corrugated pipe being fed, and means responsive to sensed variations in the tension in the pipe for varying the rate of movement of said forwardly driven teeth to thereby vary the rate of feed of the pipe.

8. Apparatus for feeding a molded corrugated plastic pipe having annular corrugations of alternating ribs and valleys along its length, said apparatus comprising a pair of rotatable feed members adapted for passage of the corrugated pipe therebetween in engagement therewith, at least one of said rotatable feed members being driven, a plurality of teeth on the periphery of at least said driven feed member with said teeth being spaced apart a distance such that they are successively moved into engagement with the corrugations of the pipe so that successive teeth will enter certain successive valleys and will push forwardly against the respective ribs of the corrugated pipe, means positioned upstream of said feed members for sensing variations in tension in the corrugated pipe being fed, and means responsive to sensed variations in tension in the pipe for varying the rate of rotation of said rotatable feed members to thereby vary the rate of feed of the pipe.

9. Apparatus according to claim 8, wherein the other of said rotatable feed members has a smooth peripheral surface.

10. Apparatus according to claim 8, wherein the other of said rotatable feed members also is driven and also includes a plurality of teeth on the periphery thereof spaced apart about the same distance as the teeth on said one of said rotatable feed members.

11. Apparatus according to claim 8, including an additional rotatable feed member engaging the pipe in angularly spaced relation from said first-named pair of rotatable feed members.

12. Apparatus according to claim 11, wherein said additional rotatable feed member also includes a plurality of teeth on the periphery thereof for engagement thereof with the corrugations of the corrugated plastic pipe.

13. Apparatus for feeding a molded corrugated plastic pipe through a work station while maintaining a predetermined relationship between the corrugated pipe and the work station, and wherein the pipe includes alternating ribs and valleys along its length, said apparatus comprising driven first and second rotatable toothed feed members adjacent the respective entrance and exit ends of said work station, said first and second feed members being engageable with the corrugated pipe with the teeth of each feed member successively moving into the valleys of the pipe and forwardly against the respective ribs of the pipe, means positioned upstream of said feed members for sensing variations in tension in the corrugated pipe in its course to said first rotatable feed member, and means responsive to said sensing means for varying the rate of rotation of said first and second rotatable feed members according to the thus sensed variations in tension.

* * * * *